United States Patent
Kenreich et al.

[11] 3,818,729
[45] June 25, 1974

[54] BRAKE YOKE ROD RETAINER FOR AUTOMATIC WASHERS

[75] Inventors: Richard R. Kenreich; Paul L. Schulz, both of St. Joseph; Albert Houck; Gerald L. Kretchman, both of Stevensville, all of Mich.

[73] Assignee: Whirlpool Corporation, Benton Harbor, Mich.

[22] Filed: Jan. 10, 1973

[21] Appl. No.: 322,305

[52] U.S. Cl. .................................. 68/23.7, 85/80
[51] Int. Cl. ........................................ D06f 37/40
[58] Field of Search ............ 68/23, 23.6, 23.7, 133; 85/5 R, 80, 84; 151/41.75; 403/263

[56] References Cited
UNITED STATES PATENTS

| | | | |
|---|---|---|---|
| 2,610,498 | 9/1952 | Geldhof et al. | 68/23.7 |
| 2,869,698 | 1/1959 | Conlee | 68/23.7 X |
| 2,956,605 | 10/1960 | Rapata | 85/80 |

Primary Examiner—Harvey C. Hornsby
Assistant Examiner—Philip R. Coe
Attorney, Agent, or Firm—Hill, Gross, Simpson, Van Santen, Steadman, Chiara & Simpson

[57] ABSTRACT

A retainer device for maintaining a first member such as a brake yoke in an automatic washer in engagement with a second member such as a brake yoke rod. The retaining member has a central disc portion with an aperture therethrough. A segmented tubular member projects from one side of the disc coaxially with the aperture and terminates in out-turned flanges adjacent the ends of the segments. The other side of the disc has a plurality of circumferentially spaced fingers projecting therefrom terminating in in-turned flanges. The segmented tubular projection is inserted into an aperture in the first member having a diameter less than the outer diameter of the out-turned flanges, the segments being resilient to allow insertion through the aperture, and the flanges retaining the retainer in engaged relation with the first member. The second member having a cylindrical portion with an increased diameter bulge thereon, is inserted through the apertures in the segmented tubular portion and the disc portion with the bulge portion entrapped between a surface of the disc and the in-turned flanges of the fingers.

3 Claims, 5 Drawing Figures

BRAKE YOKE ROD RETAINER FOR AUTOMATIC WASHERS

BACKGROUND OF THE INVENTION

1. Field of the Invention

This invention relates to retaining devices, and more particualrly to a device for coupling together a brake yoke rod and brake yoke in an automatic washer.

2. Prior Art

A variety of mechanical devices for coupling together two members exist. Where a releasable coupling is desired, both threaded and non-threaded couplings have been used. Many such systems incorporate the use of a retainer member which is used to retain the two members in attached together relation. While devices such as bolts and the like using threaded couplings worked satisfactorily in certain environments, in other environments such as the moisture laden and high vibrational environment of a washing machine, such devices have disadvantages.

Other devices, such as snap rings and the like, also contain disadvantages in such environments. Further, the majority of other non-threaded retainers rely on press fit or interference fit relationships. Such devices are generally not acceptable in high vibration environments.

While it has been known to use resilient retainers in effecting certain prior art couplings, they are generally unidirectional in retaining properties, or they are difficult to disassemble.

It would be an advance in the art if a retainer for coupling together two members could be provided which would have none of the disadvantages of the prior art, while having advantages of ease of disassembly and assembly, security of attachment, ability to withstand environmental degradation and vibration, ability to withstand high loads, all while being inexpensive to manufacture and assemble.

SUMMARY OF THE INVENTION

Our invention provides a mechanical coupling retainer device which overcomes the disadvantages of the prior art while retaining desirable advantages of certain of the individual examples of the prior art.

The device is described and illustrated as used in an automatic washing machine where the retainer functions to attach the brake yoke to the stationary brake yoke rod. The retainer consists of a one-piece member having spaced apart axial ends. Intermediate the axial ends a discshaped portion is provided. The disc-shaped portion has a central aperture and radial walls. From one of the radial walls a circumferentially segmented tube comprising a head portion projects. The tube is coaxial with the aperture and has an outer diameter less than the diameter of the disc. The segments of the tube extend outwardly from the disc terminating in out-turned flange portions having cammed outer axial end surfaces. The other radial wall of the disc has a plurality of circumferentially spaced apart axially extending fingers comprising a tail portion projecting therefrom. The fingers are positioned adjacent the outer diameter of the disc and extend axially outwardly terminating in in-turned flanges having axially and radially inclined surfaces.

The brake yoke has an aperture therethrough having a diameter substantially equal to the outer diameter of the segmented tube intermediate the out-turned flange and the disc. The axial length of the tube intermediate the out-turned flange and the disc is approximately equal to the thickness of the brake yoke in the area of the aperture. The cammed outer axial end surfaces of the out-turned flange portions extend inwardly to a diameter less than the diameter of the aperture in the brake yoke, whereby the retainer may be assembled onto the brake yoke by pressing the segmented tube portion through the aperture compressing the resilient segments to allow entry of the out-turned flange portion through the aperture in the brake yoke. Thereafter, the segments will spring back due to their resiliency to their normal diameter where the out-turned flange will have an outer diameter greater than the aperture in the brake yoke. Thus, the brake yoke will be entrapped between the out-turned flange of the segmented tube and the radial wall of the disc. In this manner, the retainer is secured on the brake yoke.

The brake yoke rod is substantially cylindrical with a frusto-conical axial end. Spaced axially of the rod from the end is an increased diameter bulge portion. The rod is inserted into the aperture in the retainer. The normal diameter of the rod is approximately equal to the inner diameter of the segmented tube. The outer diameter of the bulge portion is greater than the inner diameter of the in-turned flanges of the fingers of the retainer. With the rod inserted into the aperture of the retainer, the rod is pushed through the retainer until the spring fingers have snapped over the bulge, entrapping the bulge between the in-turned flange of the spring fingers and the other radial wall of the disc. In this manner, the retainer attaches the brake yoke rod to the brake yoke inasmuch as movement of the brake yoke rod with respect to the retainer is restricted by the in-turned flanges of the spring fingers and movement of the retainer with respect to the brake yoke is prevented by the out-turned flanges of the tube segments.

The fingers are preferably formed of one piece with the remainder of the retainer and the entire unit is preferably formed of a resilient moisture-resistant material.

The fingers, being resilient, can be spread apart to allow ease of disassembly of the two attached together members.

It is therefore an object of this invention to provide a retainer member for attaching together two individual members, the retainer having resilient portions indexible with rigid portions of the members to be attached together.

It is another more specific object of this invention to provide a retainer for attaching together two members, the retainer having a central disc or shoulder portion with a resilient centrally apertured head portion projecting from one side thereof and a resilient tail portion projecting from the other side thereof. The head portion being attachable to a first member, and the tail portion being attachable to a second member to maintain the two members in attached together relation.

It is yet another and more specific object of this invention to provide a retaining device for retaining two members together, the device having a central disc portion with a segmented centrally apertured resilient tube projecting from one radial face of the disc and terminating in a radially out-turned flange and a plurality of resilient fingers projecting from the opposite radial face of the disc, terminating in in-turned flanges, the retainer device adapted to attach together two members by entrapping one of the members between the outturned flange of the segmented tube and the one radial face of the disc and by entrapping the other member between the in-turned flange of the fingers and the opposite radial face of the disc while providing ease of disassembly.

It is yet another and most specific object to provide an automatic washing machine wherein two members such as a brake yoke rod and brake yoke are coupled together through a retainer device, the device having a central portion with a yieldable centrally apertured head portion projecting therefrom, the head portion being attached to one of the members to be attached together by entrapping a portion of the member between a flange at the axial end of the head portion and a wall of the central portion, the central portion having a plurality of resilient fingers projecting therefrom opposite the head portion providing a tail portion, the other of the members to be attached together entrapped between a portion of the tail portion and the central portion.

BRIEF DESCRIPTION OF THE DRAWINGS

Other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
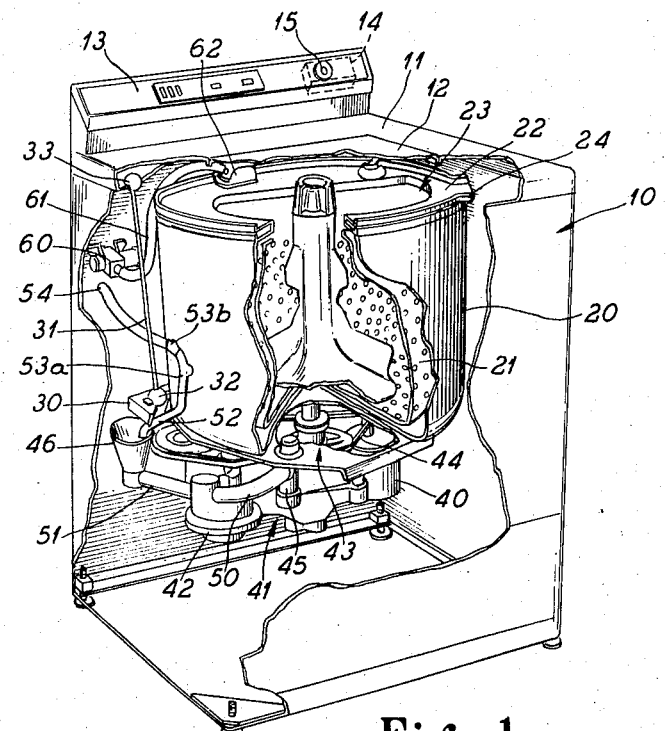
FIG. 1 is a perspective view of the automatic washer of this invention.

The automatic washer as illustrated in FIG. 1 has a cabinet 10, a cabinet top 11, having a lid 12 and a console 13. The console is provided with a timer dial 15 connected to a timer 14 to control the operation of the washer. The operations controlled by the timer include a washing operation where the clothes are agitated to remove soil, a draining operation where the washing liquid is removed from the machine and a spinning or extraction operation where the clothes are centrifuged to remove more liquid from the clothes.

A tub 20 has a concentric perforated basket 21 inside for receiving clothes to be washed. A tub ring 22 is provided to prevent splash from the washing action from flowing over the top of the tub. The tub ring 22 is provided with an opening 23 through which clothes are received into the basket 21. An agitator 24 is provided within the basket 21 to impart a washing action to the clothes.

The tub is supported by a base plate 30. The base plate is suspended from the cabinet 10 by three suspension rods, rod 31 being illustrated. The rod 31 is connected to the base plate 30 by a resilient member 32 and to the cabinet 10 by a resilient member 33.

A motor 40 and a transmission 41 are suspended from the base plate 30 and provide a means of driving the agitator 24 and basket 21. A reversible pump 42 is provided to circulate the washing liquid during the washing operation and to remove the liquid from the tub 20 during the draining and spinning operations. A clutch and brake assembly indicated at 43 allows for engagement of the agitator 24 for oscillatory motion during the washing operation while holding the basket 21 stationary and for disengagement of the agitator 24 and engagement of the basket 21 for spinning motion of the basket during the spinning operation. The transmission 41, pump 42, and clutch and brake assembly 43 are driven by the motor 40 through a belt 44.

Water flows into the machine through a timer controlled solenoid valve 60, through conduit 61 and antisyphon device 62 into the tub 20. During the washing operation, washing liquid is circulated from the tub 20 by suction from the pump 42 through a check valve 53a which allows flow out of but not into the tub and conduit 52 to a filter 46 where particles such as lint are filtered from the washing liquid. The liquid flows through the conduit 51 to the pump 42 and is then pumped through conduit 50 and a button trap 45 back to the tub 20. During draining of the tub, the pumping direction of the pump is reversed and wash liquid then flows from the tub 20 through button trap 45 and conduit 50 to the pump 42. The wash liquid is then pumped through conduit 51, the filter 46 to clean the filter of all collected particles, through the conduit 52, a check valve 53b which allows flow in thid direction only, and conduit 54 to a drain (not shown).

Figure 2:
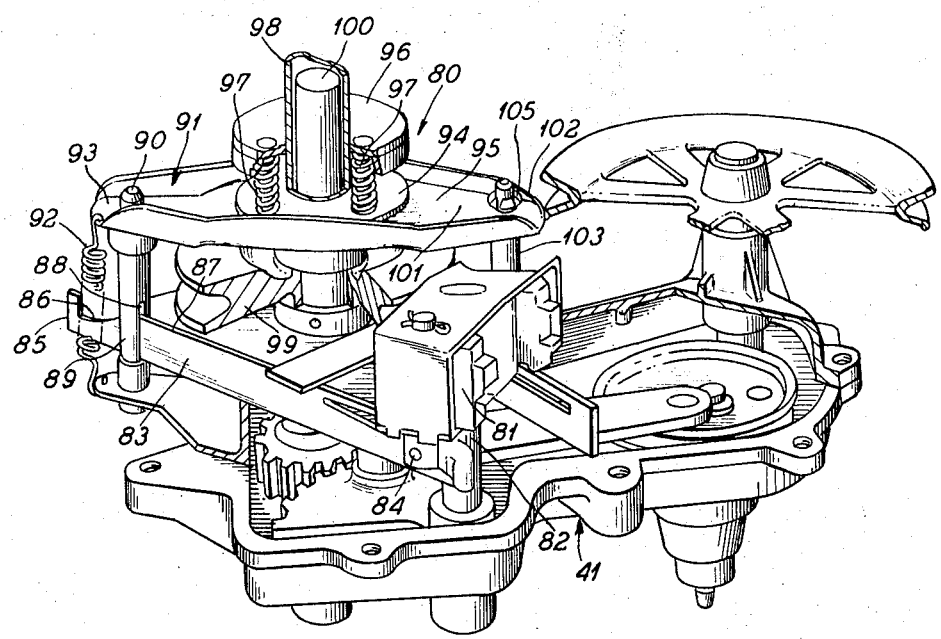
FIG. 2 is a side view of the transmission of the automatic washer of this invention.

The transmission 41 is more fully illustrated in FIG. 2. The transmission is used to drive both the agitator 24 and the basket 21. When it is desired to stop revolution of the basket 21, such as at the end of the spinning cycle, a brake system, which is a part of the clutch and brake assembly 43, is provided. The brake system, generally indicated at 80, is actuated by a solenoid 81. The solenoid 81 is mounted atop a shaft 82 and oscillates through action of the transmission. The solenoid 81 is connected to a cam bar 83 through an operator 84 attached adjacent one end of the cam bar. Adjacent the opposite end 84 of the cam bar is an inclined cam surface 86 extending upwardly to a top cam surface 87. The cam bar is received through a slot 88 in a vertically movable rod 89. The rod has one end 90 thereof attached to a brake yoke 91, adjacent one end 93 of the yoke. A spring 92 acts to maintain the rod 89 in contact with the surfaces 86, 87 of the cam bar 83. A first brake disc 94 is positioned on the upper surface 95 of the brake yoke and is in contact with a second brake disc 96 through a plurality of springs 97. The second brake disc 96 is connected to a spin tube 98, through a clutch (not shown). The spin tube has one end thereof connected to the basket 21. The spin tube extends through the brake discs and the brake yoke and is connected to a drive mechanism 99. The drive mechanism 99 is coupled to the transmission and motor by means of the belt 44. A concentric shaft 100 received interiorly of the spin tube 97 is connected to the agitator 24. The shaft 100 is connected to be driven by a gear mechanism in the transmission 41.

The end 102 of the brake yoke opposite the end 91 is attached to a stationary rod 103 by means of a retainer 105. When it is desired to brake the spinning of the basket 21, the solenoid 81 actuates the operator 84 to move the cam bar 83. This causes the vertically movable rod 89 to move upwardly on the cam surface 86 to the top cam surface 87 of the cam bar, as shown in FIG. 2. This upward movement of the rod 89 causes the end 91 of the brake yoke to move upwardly. The brake yoke carries the first brake disc 94 upwardly and the springs 97 act to urge the brake disc 96 into contact with the underside of the base plate 30. Contact between the brake disc 96 and the underside of the base plate 30 produces a motion restriction which is imparted to the spin tube 98.

The up and down motion of the brake yoke is supported at the end 102 of the brake yoke opposite the end 93 by the attachment of the brake yoke to the stationary rod 103 through the retainer 105. The rod 103 and retainer 105 act as a pivot point for the yoke while retaining the yoke in place on the rod.

In order to attach the brake yoke to the rod 103, the retainer member 105 must allow relative movement between the two parts to accommodate the pivoting of the brake yoke on the stationary rod while at the same time providing a secure retention of the brake yoke on the stationary rod. The use of such a retainer in the position illustrated in an automatic washer requires that the retainer be resistant to environmental degradation and be resistant to loosening caused by vibration. Additionally, the retainer should have sufficient strength to withstand the large forces applied to it when the brake on the automatic washer is operated. It is desirable that the retainer be easy to install while also being easy to remove to facilitate servicing of the unit.

Figure 3:
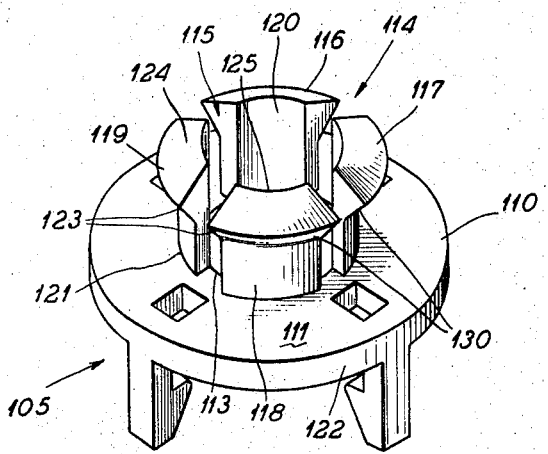
FIG. 3 is a top perspective view of the retainer of this invention.
Figure 4:
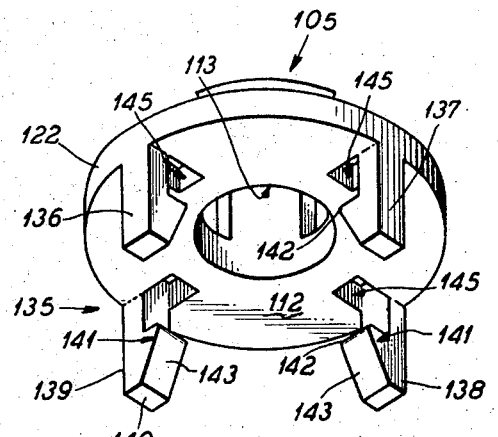
FIG. 4 is a bottom perspective view of the retainer of this invention.
Figure 5:
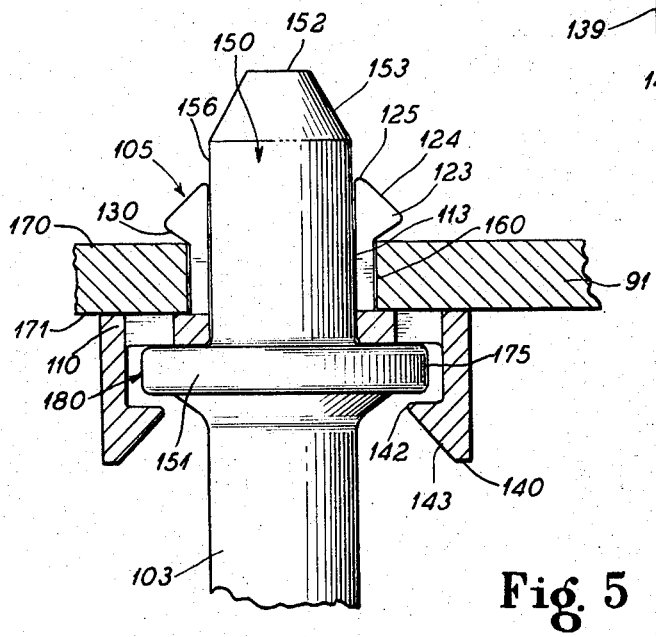
FIG. 5 is a cross-secitonal view of the brake yoke of the automatic washer of this invention.

The retainer 105 of our invention is best illustrated in the enlarged views of FIGS. 3, 4 and 5. The retainer consists of a single piece having an axially central disc or shoulder portion 110. The disc 110 has radial faces 111 and 112 forming respectively a top and bottom surface of the disc. The disc has a central aperture 113 therethrough. A head portion 114 projects from the top radial face 111. The head portion 114 consists of a segmented tube 115 divided into circumferentially spaced apart segments 116, 117, 118, 119. The tube has an inner diameter 120 approximately equal to the aperture 113 in the disc and is coaxial with the aperture 113. The outer diameter surface 121 of the tube is spaced inwardly from outer periphery 122 of the disc. The axial ends of the segments remote from the disc 110 extend outwardly in an out-turned segmented flange 123 which has a major diameter greater than the outer diameter 121 of the remainder of the tube 115. The flange 123 has it greatest diameter intermediate the axial end points 125 of the segments and the radial face 111 of the disc 110. The axial end surfaces 124 of the segments are formed as angled cam surfaces, extending radially outwardly from the axial end point 125 of the individual segments and toward the disc or shoulder 110. The axial end surfaces 124 provide a frusto-conical end surface to the out-turned flange. The opposite surface or underside surface 130 of the flange portion of the segments may also be frusto-conically shaped.

A tail portion 135 of the retainer 105 depends from the bottom radial face 112 of the disc 110. The tail portion 135 consists of four equidistantly spaced apart axially extending fingers 136, 137, 138 and 139. The fingers project from the radial face 112 adjacent the outer diameter 122 of the disc and terminate at their axial free ends 140 in in-turned flanges 141. The in-turned flanges 141 have their minor diameters 142 intermediate the outer axial ends 140 of the fingers and the disc 110 with an inclined surface 143 extending from the minor diameter 142 to the axial ends 140. The minor diameter 142 of the in-turned flanges is greater than the diameter of the central aperture 113. Individual apertures 145 may extend through the disc 110 radially inwardly of the fingers and adjacent thereto to allow the fingers to more easily deflect when the rod shoulder 151 is inserted as will be hereinafter explained.

As illustrated in FIG. 5, the retainer 105 of this invention is used with a rod end 150, such as may be formed on the end of the stationary rod 103. The rod end has a bulged radially extending shoulder 151 spaced from the axial end 152. The axial end 152 may have a frusto-conical transitional portion 153 extending outwardly from the end 152 to a full diameter cylindrical section 156. The cylindrical section 156 extends to the shoulder 151. The diameter of the cylindrical portion 156 is approximately the same as the diameter of the aperture 113 of the retainer 105. If desired, the diameter of the cylindrical portion 156 may be less than the aperture 113 to allow tilting of the rod with respect to the retainer. In any event, the diameter of the cylindrical portion 156 is great enough so that when the head portion of the retainer is received through an aperture 160 in a member to which the rod is to be attached such as the brake yoke 91, the cylindrical portion of the rod will prevent removal of the head portion. When the aperture 160 is formed with a diameter substantially equal to, or slightly greater, than the diameter 121 of the head portion, the flanges 123 will overlap the surface 170 of the brake yoke 91 on one side of the yoke, and the disc 110 will overlie the surface 171 on the other side of the yoke. As long as the diameter of the cylindrical portion 156 of the rod is not smaller than the inner diameter 120 of the head portion by an amount equal to the difference between the diameter of the aperture 160 and the major diameter of the flanges 123, the cylindrical portion will prevent the segments of the segmented tube from being compressed radially inwardly sufficiently to allow the flanges to be received in the aperture 160 in the brake yoke. Thus, the cylindrical portion 156 of the rod end 150 prevents the retainer from being removed from the brake yoke. In this manner, the retainer 105 is firmly affixed to the brake yoke.

The retainer is also firmly affixed to the rod end 150. The outer diameter 175 of the bulge 151 is greater than the minor diameter 142 of the in-turned flange of the fingers 136, 137, 138, 139. In this manner, when the bulge 151 has been pushed into the space 180, intermediate the disc 110 and the in-turned flanges 141 by spreading apart the fingers, the rod will be retained on the retainer 105, due to the resilient nature of the fingers which allows them to spring back to the position shown where the minor diameter of the flanges is less than the diameter of the bulge.

It can therefore be seen from the above that our invention provides a retainer which will couple two members together in a secure fashion and which will not work loose due to vibration. Additionally, the retainer is easy to assemble, requiring only a snap fit and is easy to disassemble by spreading apart the fingers of the tail portion 135 to allow withdrawal of the rod. The retainer is stable in the brake yoke aperture 160 because of the fact that the projection of the rod end in the aperture 113 prevents a separation of the retainer from the brake yoke member 91. Also, the retainer can withstand the large forces applied to it when the brake on the automatic washer is operated because the disc 110 receives support from the rod shoulder 151 when forces are applied from the brake yoke 91 through the retainer 105 to the rod 103. Further, the retainer assembly is capable of accommodating relative movement between the attached together members by means of its resilient nature and through dimensional clearances between interfitting parts.

The retainer of our invention consists of single piece having a yieldable centrally apertured head portion for receiving an end of a rod, a shoulder portion at one end of the head portion and a yieldable tail portion for receiving a radially extending protrusion on the rod to lock the retainer and the rod in an aperture in a second member to be coupled to the rod.

Although the teachings of our invention have herein been discussed with reference to specific theories and embodiments and although illustrative means for accomplishing explained results have been described, it is to be understood that these are by way of illustration only, and that others may wish to utilize our invention in different designs or applications.

The embodiments of the invention in which an exclusive property or privilege is claimed are defined as follows:

1. An automatic washer having a clothes container for receiving clothes to be washed, a transmission, and a motor for driving said transmission, a braking assembly connected to said transmission comprising:
   a brake yoke with a first aperture therethrough,
   a brake yoke rod, the rod having a free end,
   an increased dimension bulge portion of said rod spaced from said free end,
   a rod end portion intermediate the free end and the bulge,
   a retaining member, the retaining member having an intermediate portion with a second aperture therethrough dimensioned to receive the rod end portion,
   a head portion on said retainer, the head portion having a plurality of circumferentially spaced apart segments projecting axially of and attached to the intermediate portion, the segments being equidistantly spaced from the second aperture and having an inner diameter substantially the same as the second aperture,
   the segments having out-turned flanges adjacent free ends opposite the intermediate portion, the out-turned flanges spaced at a distance from the intermediate portion, said segments received in the first aperture in the brake yoke,
   the intermediate portion overlying a first surface of said brake yoke, said out-turned flanges overlying portions of a second surface opposite the first surface of said brake yoke,
   said rod end portion extending through said first and second apertures interiorly of said segments,
   a tail portion on said retaining member, said tail portion having a plurality of circumferentially spaced apart fingers extending axially of said intermediate portion opposite said segments,
   said fingers terminating in free ends,
   in-turned flanges on said fingers adjacent said free ends,
   said in-turned flanges having a minor diameter less than the diameter of the bulge portion of said rod, and
   said bulge portion of the said rod entrapped between said in-turned flanges of said fingers and the intermediate portion of said retaining member.

2. The washing machine of claim 1, wherein said fingers and said segments are resilient.

3. The washing machine of claim 2, wherein said out-turned flanges have an outer diameter greater than the diameter of the first aperture and said rod end portion of said rod has a diameter less than the inner diameter of the segments by an amount less than the difference between the outer diameter of said out-turned flanges and the diameter of said first aperture in the brake yoke, whereby when the rod end is received interiorly of the segments, the retaining member cannot be removed from the brake yoke.

* * * * *